(12) United States Patent
Youn

(10) Patent No.: US 11,059,538 B1
(45) Date of Patent: Jul. 13, 2021

(54) ELECTRIC KICK SCOOTER

(71) Applicant: Je Hyuk Youn, Hwaseong-si (KR)

(72) Inventor: Je Hyuk Youn, Hwaseong-si (KR)

( * ) Notice: Subject to any disclaimer, the term of this patent is extended or adjusted under 35 U.S.C. 154(b) by 0 days.

(21) Appl. No.: 16/080,342

(22) PCT Filed: Apr. 24, 2018

(86) PCT No.: PCT/KR2018/004723
§ 371 (c)(1),
(2) Date: Aug. 28, 2018

(87) PCT Pub. No.: WO2019/156285
PCT Pub. Date: Aug. 15, 2019

(30) Foreign Application Priority Data

Feb. 9, 2018 (KR) .................... 10-2018-0016088

(51) Int. Cl.
*B62K 3/00* (2006.01)
*B62K 25/04* (2006.01)

(52) U.S. Cl.
CPC ............. *B62K 3/002* (2013.01); *B62K 25/04* (2013.01); *B62K 2025/045* (2013.01); *B62K 2201/08* (2013.01); *B62K 2204/00* (2013.01)

(58) Field of Classification Search
CPC ................................ B62K 3/002; B62K 25/04
See application file for complete search history.

(56) References Cited

U.S. PATENT DOCUMENTS

| | | | | |
|---|---|---|---|---|
| 10,167,034 B2 * | 1/2019 | Lemaitre | .................... | F16D 3/38 |
| 10,850,783 B2 * | 12/2020 | Cordero | .................. | B60L 50/52 |
| 2001/0030404 A1 * | 10/2001 | Liu | ..................... | A63C 17/0046 |
| | | | | 280/87.041 |
| 2002/0109323 A1 * | 8/2002 | Darnell | .................. | B62K 3/002 |
| | | | | 280/87.041 |
| 2003/0213633 A1 * | 11/2003 | McDermott | ......... | B62K 25/283 |
| | | | | 180/227 |
| 2004/0227317 A1 * | 11/2004 | Cheng | .................... | B62K 25/16 |
| | | | | 280/87.041 |
| 2005/0167168 A1 * | 8/2005 | Puzey | ..................... | B60G 15/06 |
| | | | | 180/65.1 |
| 2011/0316247 A1 * | 12/2011 | Johnson | ................. | B62K 3/002 |
| | | | | 280/87.05 |
| 2015/0137469 A1 * | 5/2015 | Lee | ......................... | B62K 3/002 |
| | | | | 280/87.03 |
| 2021/0053648 A1 * | 2/2021 | Cordero | ................. | B62K 11/10 |

FOREIGN PATENT DOCUMENTS

| | | |
|---|---|---|
| KR | 10-1729620 | 4/2017 |
| WO | 2018/101543 | 6/2018 |

\* cited by examiner

*Primary Examiner* — Tony H Winner

(74) *Attorney, Agent, or Firm* — Lex IP Meister, PLLC

(57) ABSTRACT

An electric kick scooter according to the present invention includes a handle unit, a first connecting unit, a foot deck, and a second connecting unit. The electric kick scooter switches a direction in which impact occurring due to an uneven road surface when the electric kick scooter passes the uneven road surface is transmitted, so that the impact is transmitted in a direction diagonal to the road surface from a direction perpendicular to the road surface, thereby providing a rider with stable ride quality and providing the rider with various traveling environments and a mounting function by adjusting a height of a ground clearance.

5 Claims, 11 Drawing Sheets

[FIG. 1]
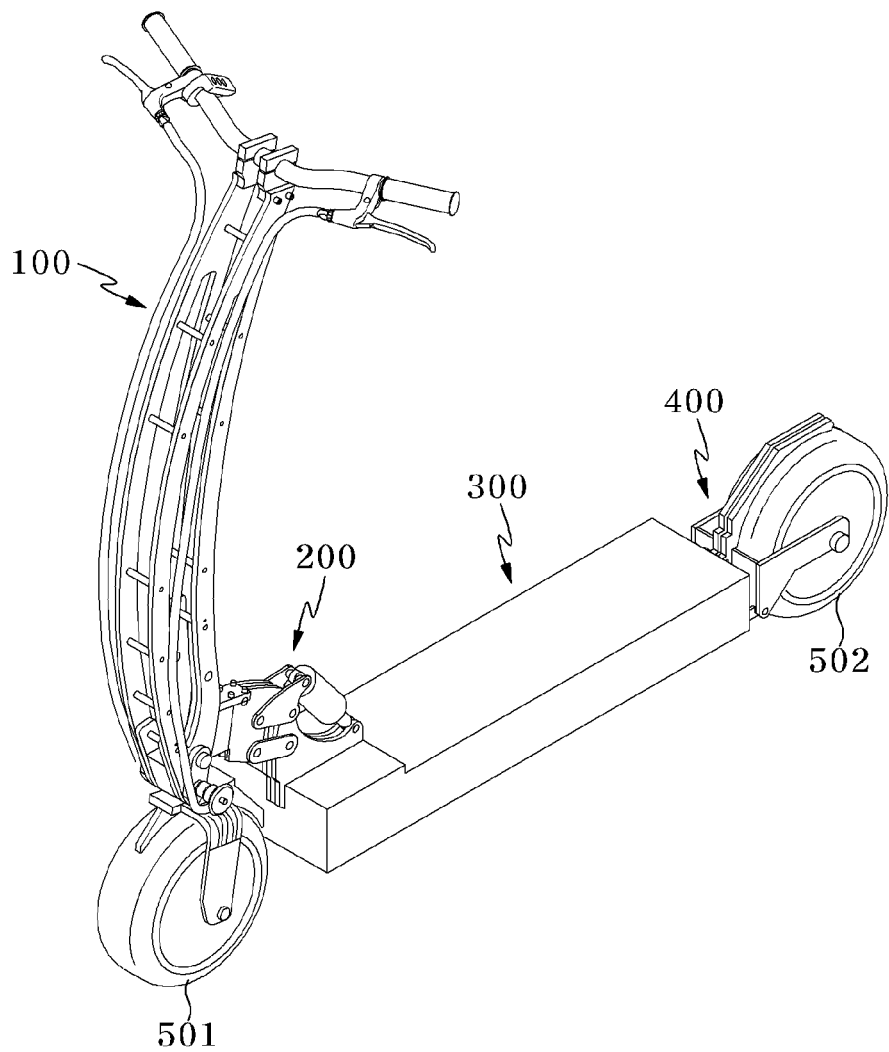

[FIG. 2]
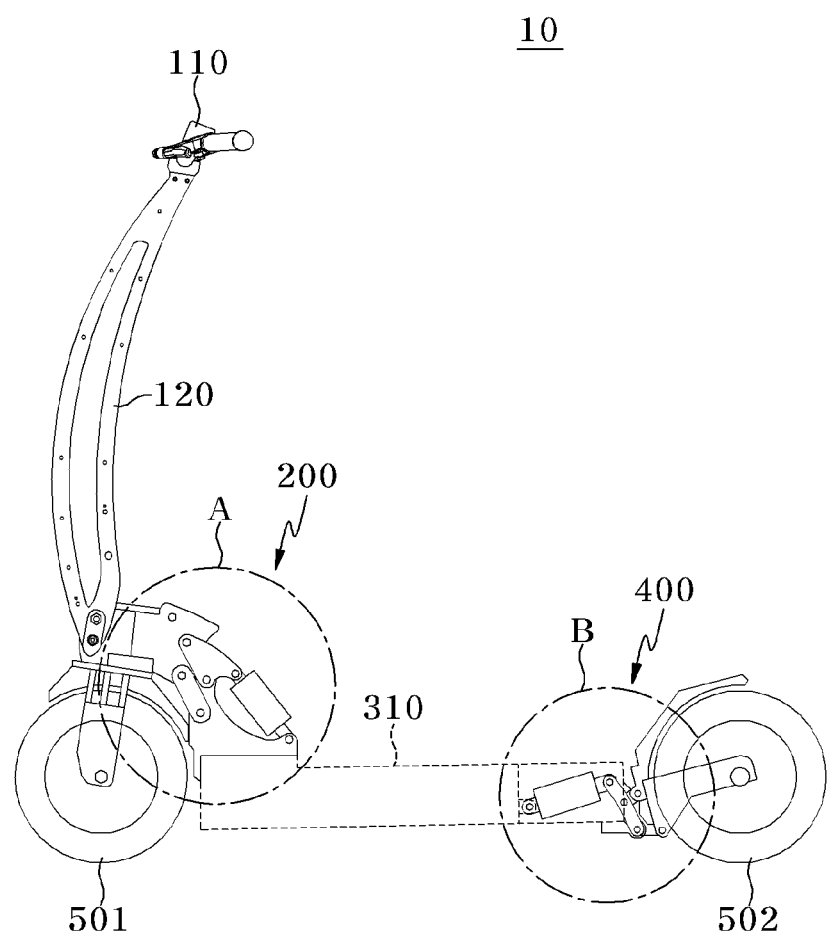

[FIG. 3]
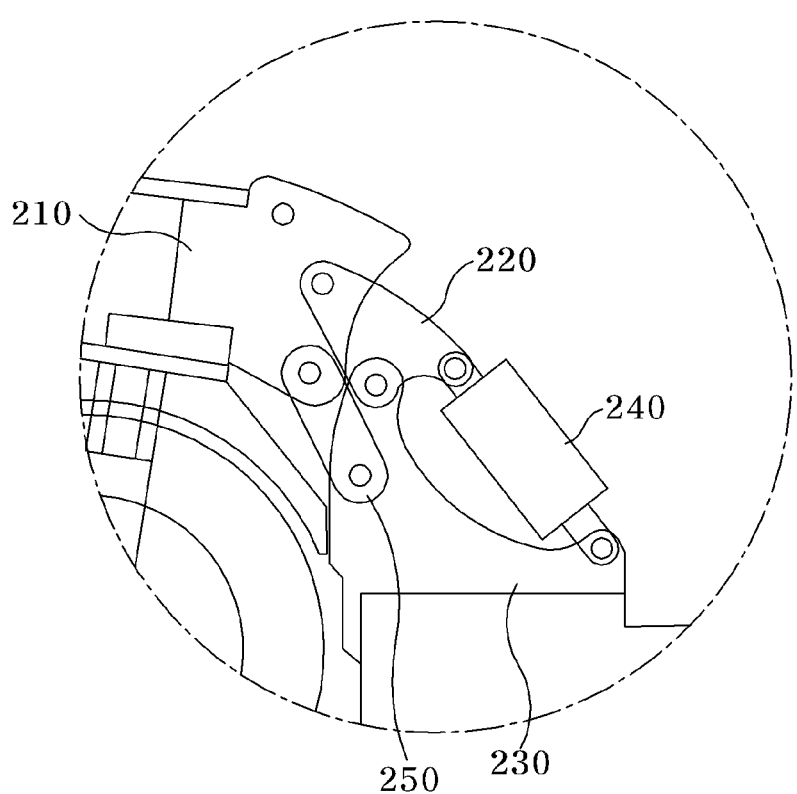

[FIG. 4]
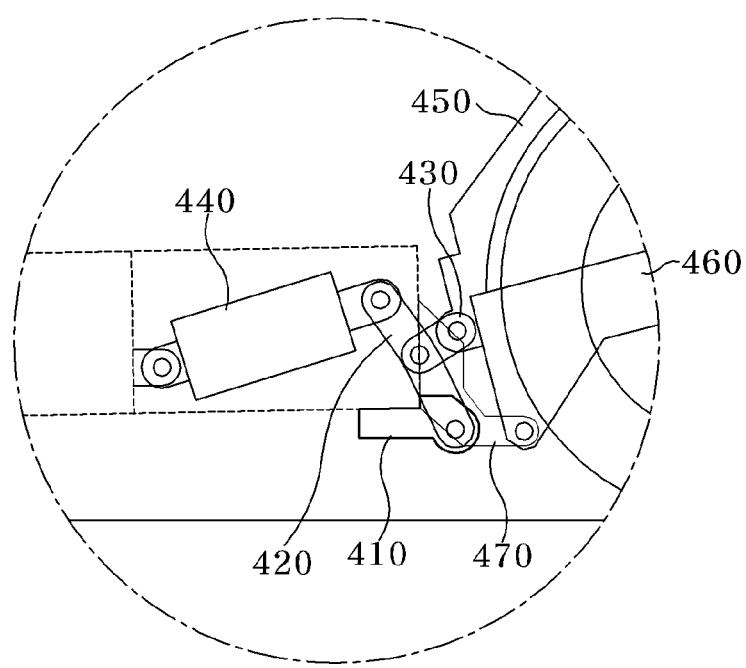

[FIG. 5]
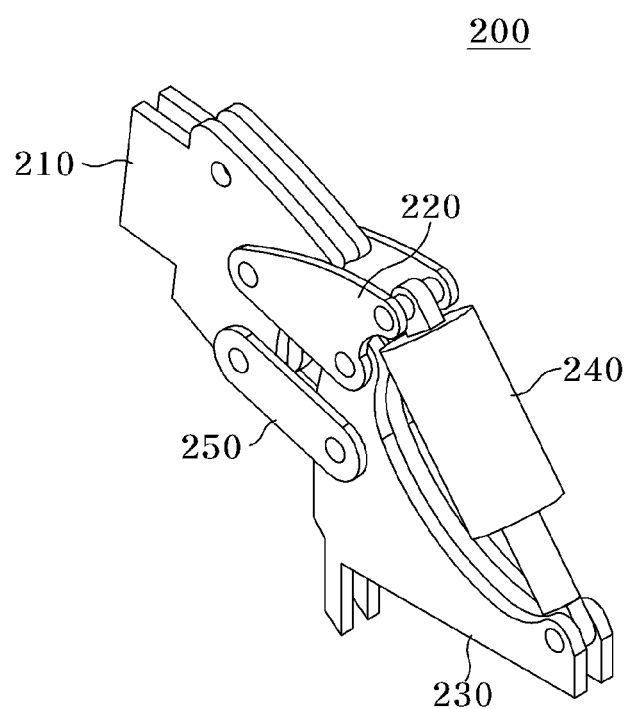

[FIG. 6]
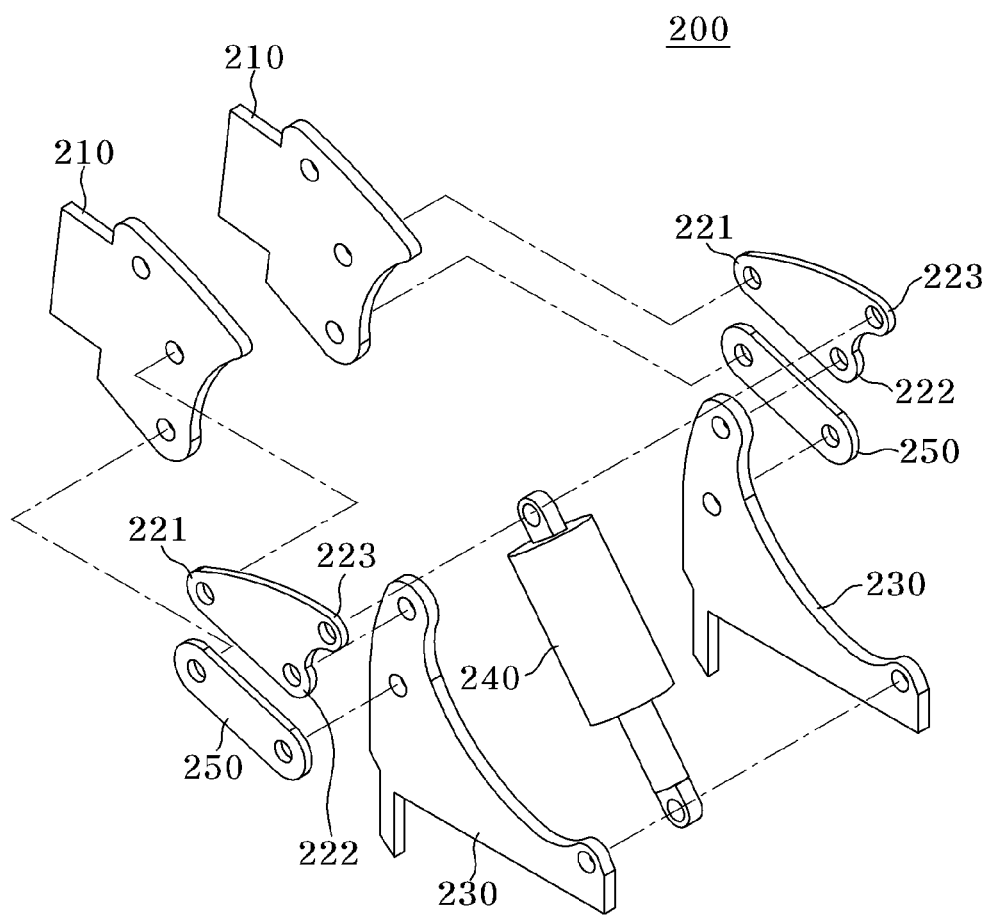

[FIG. 7]
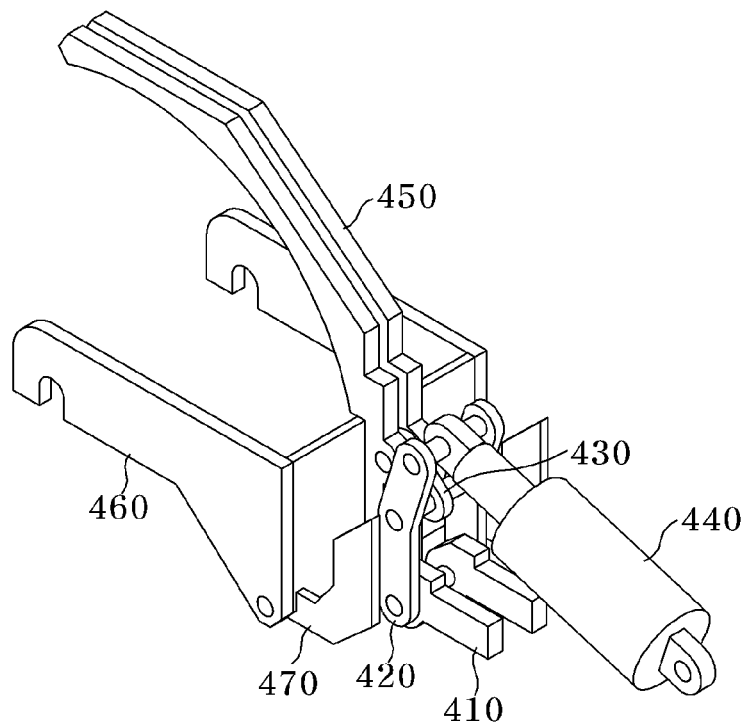

[FIG. 8]
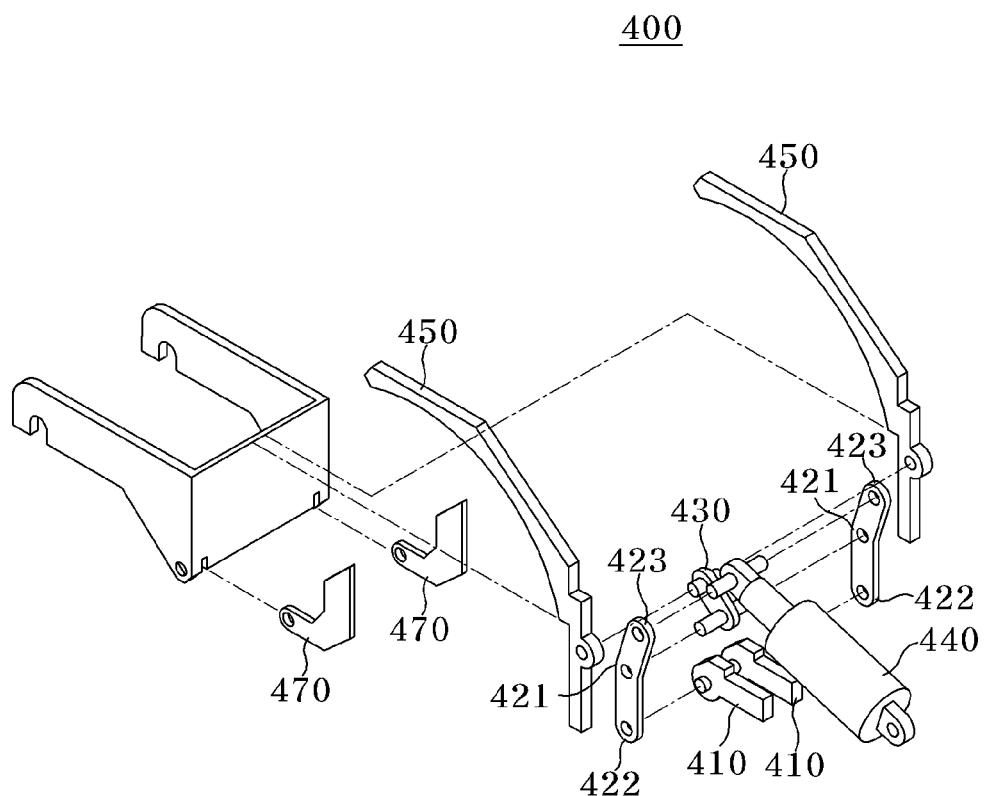

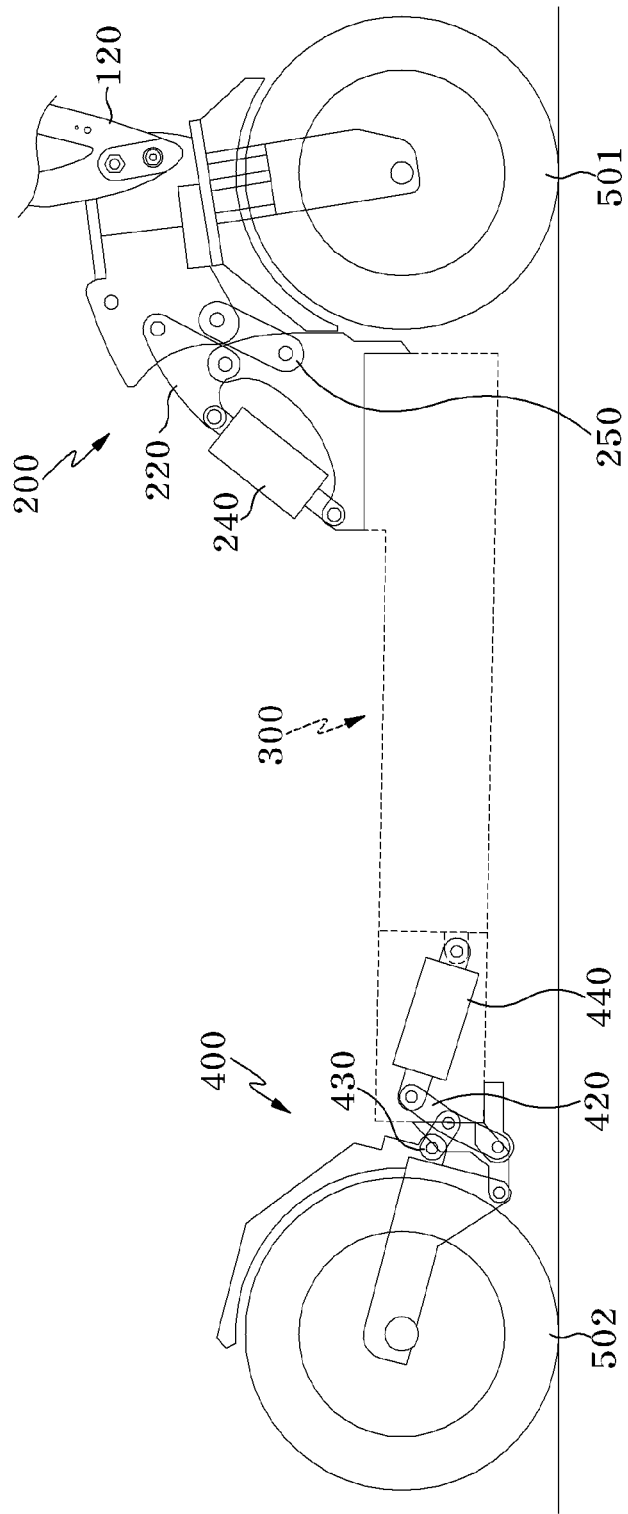
[FIG. 9]

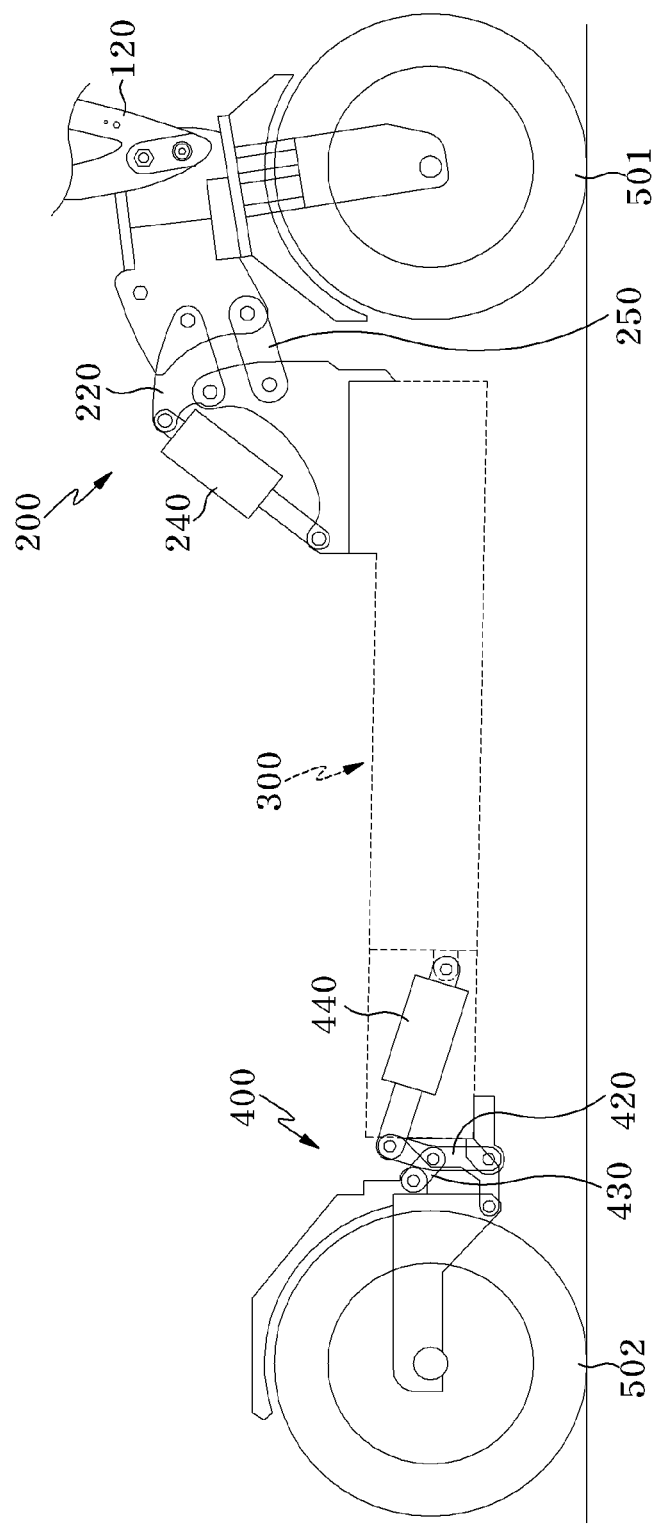
[FIG. 10]

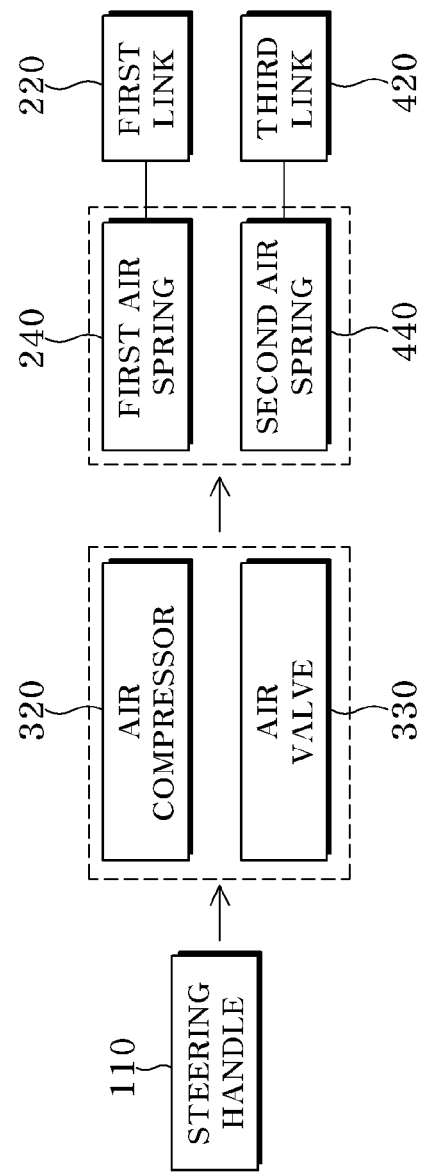

ELECTRIC KICK SCOOTER

TECHNICAL FIELD

The present invention relates to an electric kick scooter which operates wheels to enable a rider to move.

BACKGROUND ART

A kick scooter is a kind of moving means having a long handle mounted on a foot deck in the form of a skateboard, and the kick scooter allows a rider to move by using wheels mounted at front and rear sides of the foot deck. In this case, the rider may drive the kick scooter by pushing a road surface with one foot while the other foot remains on the foot deck so that the one foot is directed forward from the foot deck.

In the related art, in addition to a kick scooter having a board, a handle, and wheels, an electric kick scooter, which is additionally equipped with a power device such as a motor, is used. The electric kick scooter in the related art may travel with electricity by using a motor which is rotated by electric power supplied from a battery.

However, the electric kick scooter in the related art has no a suspension system such as an air spring, which is also called an air suspension, between the foot deck and the wheel, and as a result, when the electric kick scooter passes an uneven road surface, impact occurring due to the uneven road surface is transmitted to the rider of the electric kick scooter, which causes the rider a discomfort while the rider rides the electric kick scooter.

Furthermore, the electric kick scooter in the related art hardly provides various traveling environments to the rider because it is difficult to adjust a height of a ground clearance, and the electric kick scooter in the related art causes structural inconvenience because the electric kick scooter inevitably has a standing device for parking the electric kick scooter after driving the electric kick scooter.

DISCLOSURE

Technical Problem

A technical object, which is to be achieved by the present invention, is to provide an electric kick scooter which switches a direction in which impact occurring due to an uneven road surface, when the electric kick scooter passes the uneven road surface, is transmitted, such that the impact is transmitted in a direction diagonal to the road surface from a direction perpendicular to the road surface.

Another technical object, which is to be achieved by the present invention, is to provide an electric kick scooter in which a height of a ground clearance is adjustable.

Various technical objects of the present invention are not limited to the aforementioned technical objects, and other technical objects, which are not mentioned above, may be clearly understood by those skilled in the art from the following descriptions.

Technical Solution

An electric kick scooter according to the present invention includes a handle unit, a first connecting unit, a foot deck, and a second connecting unit. A front wheel is fastened to a lower portion at one side of the handle unit. The first connecting unit is positioned at a lower portion at the other side of the handle unit, and moves upward while pushing the handle unit forward or moves downward while pulling the handle unit rearward in accordance with pneumatic pressure supplied from an air compressor. One side of the foot deck is connected to the first connecting unit, and the foot deck moves in conjunction with the first connecting unit. The second connecting unit is connected to the other side of the foot deck, and moves upward while pulling the foot deck upward or moves downward while pushing the foot deck downward in accordance with pneumatic pressure supplied from the air compressor.

The first connecting unit includes a first support piece, a first link, a second support piece, and a first air spring. One side of the first support piece is connected to the lower portion at the other side of the handle unit. The first link has a triangular shape having first to third end portions as vertices, in which the first end portion is fastened to an upper portion of the first support piece. An upper portion at one side of the second support piece is fastened to the second end portion, and the foot deck is coupled to a lower portion of the second support piece. One side of the first air spring is positioned to be inclined upward at a predetermined angle and fastened to the third end portion, the other side of the first air spring is fastened to the second support piece, and the first air spring pushes the third end portion upward or pulls the third end portion downward based on the first end portion as a volume in the first air spring varies in accordance with the pneumatic pressure supplied from the air compressor.

A distance between the first and third end portions is longer than a distance between the first and second end portions and a distance between the second and third end portions.

The first connecting unit includes a second link. One side of the second link is fastened to a lower portion at the other side of the first support piece, and the other side of the second link is fastened to a lower portion at one side of the second support piece and moves upward or downward based on the one side of the second link as the volume in the first air spring varies.

The second connecting unit includes a third support piece, a third link, a fourth link, a second air spring, a stabilizer, and a wheel casing. One side of the third support piece is connected to the other side of the foot deck. The third link is formed to be curved based on a center portion as a vertex at both ends where first and second edges are positioned, in which the first edge is fastened to the other side of the third support piece. One side of the fourth link is fastened to the center portion. One side of the second air spring is positioned to be inclined upward at a predetermined angle and fastened to the second edge, the other side of the second air spring is fastened to the other side of the foot deck, and the second air spring pushes the second edge upward or pulls the second edge downward based on the center portion as a volume in the second air spring varies in accordance with the pneumatic pressure supplied from the air compressor. One side of the stabilizer is fastened to the other side of the fourth link. An upper portion at one side of the wheel casing is coupled to the other side of the stabilizer, a rear wheel is fastened in an internal space of the wheel casing, and one side of the wheel casing moves upward while pushing the rear wheel rearward or moves downward while pulling the rear wheel forward as a volume in the second air spring varies.

The second connecting unit includes a fourth support piece. One side of the fourth support piece is connected to the other side of the foot deck, the other side of the fourth support piece is connected to a lower portion at one side of the wheel casing, and the fourth support piece pushes the foot deck upward or pulls the foot deck as the volume in the second air spring varies.

Advantageous Effects

According to the electric kick scooter according to the present invention, it is possible to provide a rider with stable ride quality by switching a direction in which impact occurring due to an uneven road surface, when the electric kick scooter passes the uneven road surface, is transmitted, such that the impact is transmitted in a direction diagonal to the road surface from a direction perpendicular to the road surface.

In addition, according to the electric kick scooter according to the present invention, it is possible to provide the rider with various traveling environments by adjusting the height of the ground clearance, and it is possible to stand the electric kick scooter without using a standing device when parking the electric kick scooter.

It will be clearly understood that the exemplary embodiments according to the technical spirit of the present invention may provide various effects which are not specifically mentioned.

DESCRIPTION OF DRAWINGS

FIG. 1 is a perspective view of an electric kick scooter according to the present invention.

FIG. 2 is a side view of FIG. 1.

FIG. 3 is an enlarged view illustrating enlarged part "A" in FIG. 2.

FIG. 4 is a perspective view of FIG. 3.

FIG. 5 is an exploded perspective view of FIG. 4.

FIG. 6 is an enlarged view illustrating enlarged part "B" in FIG. 2.

FIG. 7 is a perspective view of FIG. 6.

FIG. 8 is an exploded perspective view of FIG. 7.

FIG. 9 is a first use state view of the electric kick scooter according to the present invention.

FIG. 10 is a second use state view of the electric kick scooter according to the present invention.

FIG. 11 is a block diagram illustrating relationships among components through which pneumatic pressure is transmitted in the electric kick scooter according to the present invention.

DESCRIPTION OF MAIN REFERENCE NUMERALS OF DRAWINGS

Reference numerals will be described below.
10: Electric kick scooter
100: Handle unit
110: Steering handle
120: Steering shaft
200: First connecting unit
210: First support piece
220: First link
221: First end portion
222: Second end portion
223: Third end portion
230: Second support piece
240: First air spring
250: Second link
300: Foot deck
310: Frame
400: Second connecting unit
410: Third support piece
420: Third link
421: Center portion
422: First edge
423: Second edge
430: Fourth link
440: Second air spring
450: Stabilizer
460: Wheel casing
470: Fourth support piece
501: Front wheel
502: Rear wheel

BEST MODE

Advantages and features of the present invention and methods of achieving the advantages and features will be clear with reference to exemplary embodiments described in detail below together with the accompanying drawings. However, the present invention is not limited to the exemplary embodiments to be described below and may be specified as other aspects. On the contrary, the exemplary embodiments introduced herein are provided to make the disclosed content thorough and complete, and sufficiently transfer the spirit of the present invention to the person skilled in the art. In addition, thicknesses of layers and regions in the drawings are exaggerated to ensure clarity.

The terms such as "first" and "second" may be used to describe various constituent elements, but the constituent elements should not be limited by the terms. These terms are used only to distinguish one constituent element from another constituent element. For example, a first component may be named a second component, and similarly, the second component may also be named the first component, without departing from the scope of the present invention.

The terms such as an upper end, an upper surface at a lower end, a lower surface, an upper portion, and a lower portion are used to distinguish relative positions of constituent elements. For example, for convenience, an upper side in the drawing is named an upper portion and a lower side in the drawing is named a lower portion, but actually, the upper portion may be named the lower portion and the lower portion may be named the upper portion without departing from the scope of the present invention.

Terms used in the present application are used only to describe specific exemplary embodiments, and are not intended to limit the present invention. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the technical field to which the present invention pertains unless they are differently defined. Terms defined in a generally used dictionary shall be construed that they have meanings matching those in the context of a related art, and shall not be construed in ideal or excessively formal meanings unless they are clearly defined in the present application.

Hereinafter, an exemplary embodiment of an electric kick scooter according to the present invention will be described in detail with reference to the accompanying drawings.

FIG. 1 is a perspective view of the electric kick scooter according to the present invention. FIG. 2 is a side view of FIG. 1.

Referring to FIGS. 1 to 2, according to an electric kick scooter 10 according to the present invention, it is possible to switch a direction in which impact occurring due to an uneven road surface, when the electric kick scooter 10 passes the uneven road surface, is transmitted, such that the impact is transmitted in a direction diagonal to the road surface from a direction perpendicular to the road surface, and it is possible to adjust a height of a ground clearance. To this end, the electric kick scooter 10 according to the present invention includes a handle unit 100, a first connecting unit 200, a foot deck 300, a second connecting unit 400, a front wheel 501 and a rear wheel 502.

The handle unit 100 is a steering system for the electric kick scooter 10 and includes a steering handle 110 and a steering shaft 120. The steering handle 110 is used to adjust a traveling direction and a steering angle of the electric kick scooter 10. In addition, the steering handle 110 may include multiple control buttons (not illustrated) for controlling pneumatic pressure applied to the electric kick scooter 10. The pneumatic pressure applied to the electric kick scooter 10 may mean pressure of air used to adjust a height of the foot deck 300 positioned between the front wheel 501 and the rear wheel 502. Meanwhile, the steering shaft 120 is positioned at a lower side of the steering handle 110 and transmits operating force of the steering handle 110 to the front wheel 501. In addition, the steering shaft 120 supports the handle unit 100, the front wheel 501, and the first connecting unit 200 so that the handle unit 100, the front wheel 501, and the first connecting unit 200 are connected to one another. The front wheel 501 is fastened at one side of a lower side of the handle unit 100, that is, at one side of the steering shaft 120.

The first connecting unit 200 will be described further with reference to FIGS. 3 to 5.

FIG. 3 is an enlarged view illustrating enlarged part "A" in FIG. 2. FIG. 4 is a perspective view of FIG. 3. FIG. 5 is an exploded perspective view of FIG. 4.

Further referring to FIGS. 3 to 5, the first connecting unit 200 is positioned at the other side of the lower side of the handle unit 100. In addition, in accordance with pneumatic pressure supplied from an air compressor, the first connecting unit 200 moves upward while pushing the handle unit 100 toward a front side of the electric kick scooter 10 or moves downward while pulling the handle unit 100 toward a rear side of the electric kick scooter 10. That is, the first connecting unit 200 may be moved upward or downward by the pneumatic pressure, thereby adjusting an interval between the handle unit 100 and the foot deck 300 and adjusting a height of the foot deck 300 from the road surface. The first connecting unit 200 includes first support pieces 210, first links 220, second support pieces 230, a first air spring 240, and second links 250.

One side of the first support pieces 210 is connected to the other side of the steering shaft 120, thereby connecting the first connecting unit 200 to the handle unit 100.

Each of the first links 220 has a triangular shape having a first end portion 221, a second end portion 222, and a third end portion 223 as vertices. In this case, a distance between the first end portion 221 and the third end portion 223 is longer than a distance between the first end portion 221 and the second end portion 222 and also longer than a distance between the second end portion 222 and the third end portion 223 so as to ensure a rotation angle of the first link 220. In addition, the first link 220 is fastened to an upper portion at the other side of the first support piece 210 through the first end portion 221.

The second support piece 230 is connected to the first link 220 as an upper portion at one side of the second support piece 230 is fastened to the second end portion 222. In addition, the foot deck 300 is coupled to lower portions of the second support pieces 230 so that the foot deck 300 moves in conjunction with the upward or downward movement of the first connecting unit 200.

The first air spring 240 is positioned such that one side of the first air spring 240, which is directed toward the front side of the electric kick scooter 10, is inclined upward at a predetermined angle. In addition, the first air spring 240 is connected to the first links 220 by being fastened to the third end portions 223. Furthermore, a volume in the first air spring 240 varies depending on the pneumatic pressure supplied from the air compressor, thereby pushing the third end portions 223 upward toward an upper side of the first connecting units 200 or pulling the third end portions 223 toward a lower side of the first connecting units 200 based on the first end portions 221. That is, a length of the first air spring 240 is adjusted in accordance with the pneumatic pressure, such that the ground clearance of the foot deck 300 as well as the interval between the handle unit 100 and the foot deck 300 may be adjusted by using the first links 220. The first air spring 240 is, for example, a spring that uses elasticity of compressed air accommodated in a container (bellows) made of rubber, and the first air spring 240 may repeatedly contract and expand in response to external force.

One side of the second links 250 is fastened to a lower portion at the other side of the first support pieces 210, and the other side of the second links 250 is fastened to a lower portion at one side of the second support pieces 230. In addition, the other side of the second links 250 is moved upward or moved downward based on one side of the second links 250 as the volume in the first air spring 240 varies. That is, the second links 250 are positioned at the lower side of the first links 220, such that the second links 250 may operate in conjunction with the first links 220 as the third end portions 223 are moved, thereby adjusting the ground clearance of the foot deck 300.

Further, the two first support pieces 210, the two first links 220, the two second support pieces 230, and the two second links 250 may be provided outside the first connecting unit 200 based on the first air spring 240 so that the first air spring 240 is positioned inside the first connecting unit 200.

One side of a frame 310 of the foot deck 300 is connected to the first connecting unit 200, and the other side of the frame 310 is connected to the second connecting unit 400, such that the foot deck 300 moves in conjunction with the upward or downward movements of the first connecting unit 200 and the second connecting unit 400. In addition, the foot deck 300 may include an air compressor (320 in FIG. 11) which is connected to the steering handle 110, and an air valve (330 in FIG. 11) which connects with the air compressor to transmit the pneumatic pressure to the first air spring 240 and a second air spring (440 in FIG. 6) from the air compressor 320 under control of the steering handle 110.

The second connecting unit 400 will be described further with reference to FIGS. 6 to 8.

FIG. 6 is an enlarged view illustrating enlarged part "B" in FIG. 2. FIG. 7 is a perspective view of FIG. 6. FIG. 8 is an exploded perspective view of FIG. 7.

Further referring to FIGS. 6 to 8, the second connecting unit 400 is positioned at the other side of the foot deck 300. In addition, in accordance with the pneumatic pressure supplied from the air compressor, the second connecting unit 400 moves upward while pulling the foot deck 300 upward toward the rear side of the electric kick scooter 10 or moves downward while pushing the foot deck 300 downward toward the front side of the electric kick scooter 10. That is, the second connecting unit 400 may be moved upward or downward by the pneumatic pressure, thereby adjusting an interval between the foot deck 300 and the rear wheel 502 and adjusting a height of the foot deck 300 from the road surface. The second connecting unit 400 includes third support pieces 410, third links 420, a fourth link 430, the second air spring 440, stabilizers 450, a wheel casing 460, and fourth support pieces 470.

One side of the third support pieces 410 is connected to the other side of the foot deck 300, thereby connecting the second connecting unit 400 to the foot deck 300.

Each of the third links 420 is formed to be curved based on a center portion 421 as a vertex at both ends where a first edge 422 and a second edge 423 are positioned. That is, to ensure a rotation angle of the third link 420, the third link 420 has a shape such that the first edge 422 and the second edge 423 define an included angle less than 180 degrees based on the center portion 421. In addition, the third link 420 is fastened to the other side of the third support piece 410 through the first edge 422.

The fourth link 430 connects with the third links 420 as one side of the fourth link 430 is fastened to the center portions 421. That is, the fourth link 430 transmits rotational force of the third links 420 to the rear wheel 502.

The second air spring 440 is positioned such that one side of the second air spring 440, which is directed toward the rear side of the electric kick scooter 10, is inclined upward at a predetermined angle. In addition, a volume in the second air spring 440 varies depending on the pneumatic pressure supplied from the air compressor, thereby pushing the second edges 423 upward toward an upper side of the second connecting unit 400 or pulling the second edges 423 toward a lower side of the second connecting unit 400 based on the center portions 421. That is, a length of the second air spring 440 is adjusted in accordance with the pneumatic pressure, such that the ground clearance of the foot deck 300 as well as the interval between the foot deck 300 and the rear wheel 502 may be adjusted by using the third links 420. The second air spring 440 is, for example, a spring that uses elasticity of compressed air accommodated in a container (bellows) made of rubber, and the second air spring 440 may repeatedly contract and expand in response to external force.

One side of the stabilizer 450 is connected to the third link 420 by being fastened to the other side of the fourth link 430.

An upper portion at one side of the wheel casing 460 is coupled to the other side of the stabilizer 450, and the rear wheel 502 is fastened in an internal space of the wheel casing 460. In addition, as the volume in the second air spring 440 varies, one side of the wheel casing 460 moves upward while pushing the rear wheel 502 toward the rear side of the electric kick scooter 10 or one side of the wheel casing 460 moves downward while pulling the rear wheel 502 toward the front side of the electric kick scooter 10.

One side of the fourth support pieces 470 is connected to the other side of the foot deck 300, and the other side of the fourth support pieces 470 is connected to a lower portion at one side of the wheel casing 460. In addition, as the volume in the second air spring 440 varies, the fourth support pieces 470 push the foot deck 300 upward or pull the foot deck 300.

Further, the two third support pieces 410, the two third links 420, the two stabilizers 450, and the two fourth support pieces 470 may be provided outside the second connecting unit 400 based on the second air spring 440 so that the second air spring 440 is positioned inside the second connecting unit 400.

A state in which the electric kick scooter 10 according to the present invention is used will be described further with reference to FIGS. 9 and 10.

FIG. 9 is a first use state view of the electric kick scooter according to the present invention. FIG. 10 is a second use state view of the electric kick scooter according to the present invention.

First, referring to FIG. 9, in a case in which a road surface is not even, the first air spring 240 of the electric kick scooter 10 according to the present invention contracts to pull downward the third end portions 223 of the first links 220 and simultaneously pull the handle unit 100 and the front wheel 501 toward the rear side of the electric kick scooter 10. That is, the electric kick scooter 10 according to the present invention may switch a direction in which impact, which occurs due to the uneven road surface when the electric kick scooter 10 travels, is transmitted to the front wheel 501, so that the impact is transmitted in a diagonal direction between the road surface and the foot deck 300 from a perpendicular direction between the road surface and the handle unit 100. In addition, the electric kick scooter 10 according to the present invention controls and contracts the first air spring 240 and the second air spring 440 by adjusting the pneumatic pressure by using the handle unit 100, such that the ground clearance is decreased, and as a result, a side portion of the foot deck 300 may be placed on a floor surface in a parking lot without using a separate standing device when the electric kick scooter 10 is parked.

Meanwhile, referring to FIG. 10, to provide a rider with various riding environments in accordance with the ground clearance, the electric kick scooter 10 according to the present invention controls and expands the first air spring 240 and the second air spring 440 by adjusting the pneumatic pressure by using the handle unit 100, thereby pushing upward the third end portions 223 of the first links 220 and pushing upward the second edges 423 of the third links 420. That is, the electric kick scooter 10 according to the present invention may increase the height of the foot deck 300 by changing positions of the first links 220 and the third links 420 by expanding the first air spring 240 and the second air spring 440.

Relationships among the components of the electric kick scooter 10 according to the present invention through which the pneumatic pressure is transmitted will be specifically described further with reference to FIG. 11. FIG. 11 is a block diagram illustrating relationships among the components through which the pneumatic pressure is transmitted in the electric kick scooter according to the present invention.

As illustrated in FIG. 11, the electric kick scooter 10 according to the present invention controls the air compressor 320 and the air valve 330 so that the air compressor 320 and the air valve 330 are operated by the steering handle 110 including the multiple control buttons (not illustrated). In this case, in the electric kick scooter 10, compressed air is delivered from the air compressor 320 to the first air spring 240 and the second air spring 440 via the air valve 330. Next, in the electric kick scooter 10, the pneumatic pressure of the first air spring 240 is transmitted to the first links 220 so that the first connecting unit 200 moves upward or downward, and the pneumatic pressure of the second air spring 440 is transmitted to the third links 420 so that the second connecting unit 400 moves upward or downward.

While the exemplary embodiments of the present invention have been described with reference to the accompanying drawings, those skilled in the art will understand that the present invention may be implemented in any other specific form without changing the technical spirit or an essential feature thereof. Thus, it should be appreciated that the exemplary embodiments described above are intended to be illustrative in every sense, and not restrictive.

The invention claimed is:

1. An electric kick scooter comprising:
   a handle unit which has a lower portion at one side to which a front wheel is fastened;
   a first connecting unit which is positioned at the lower portion at another side of the handle unit, and moves upward while pushing the handle unit forward or moves downward while pulling the handle unit rearward in accordance with pneumatic pressure supplied from an air compressor;
   a foot deck which has one side connected to the first connecting unit, and moves in conjunction with the first connecting unit; and
   a second connecting unit which is connected to another side of the foot deck, and moves upward while pulling the foot deck upward or moves downward while pushing the foot deck downward in accordance with the pneumatic pressure supplied from the air compressor,
   wherein the first connecting unit includes:
   a first support piece which has one side connected to the lower portion at another side of the handle unit;
   a first link which has a triangular shape having first to third end portions as vertices, in which the first end portion is fastened to an upper portion at another side of the first support piece;
   a second support piece which has an upper portion at one side fastened to the second end portion, and a lower portion to which the foot deck is coupled; and
   a first air spring which has one side that is positioned to be inclined upward at a predetermined angle and fastened to the third end portion, and another side of the air spring is fastened to another side of the second support piece, and pushes the third end portion upward or pulls the third end portion downward based on the first end portion as a volume in the first air spring varies in accordance with the pneumatic pressure supplied from the air compressor.

2. The electric kick scooter of claim 1, wherein a distance between the first and third end portions is longer than a distance between the first and second end portions and a distance between the second and third end portions.

3. The electric kick scooter of claim 1, wherein the first connecting unit includes a second link which has one side that is fastened to a lower portion of the first support piece, and another side that is fastened to a lower portion of the second support piece and moves upward or downward based on the one side of the second link as the volume in the first air spring varies.

4. The electric kick scooter of claim 1, wherein the second connecting unit includes:
   a third support piece which has one side connected to another side of the foot deck;
   a third link which is formed to be curved based on a center portion as a vertex at both ends where second and second edges are positioned, in which the first edge is fastened to another side of the third support piece;
   a fourth link which has one side fastened to the center portion;
   a second air spring which has one side that is positioned to be inclined upward at a predetermined angle and fastened to the second edge, and another side that is fastened to another side of the foot deck, and pushes the second edge upward or pulls the second edge downward based on the center portion as a volume in the second air spring varies in accordance with the pneumatic pressure supplied from the air compressor;
   a stabilizer which has one side fastened to another side of the fourth link; and
   a wheel casing which has an upper portion at one side coupled to another side of the stabilizer, has an internal space in which a rear wheel is fastened, and has one side that moves upward while pushing the rear wheel rearward or moves downward while pulling the rear wheel forward as the volume in the second air spring varies.

5. The electric kick scooter of claim 4, wherein the second connecting unit includes a fourth support piece which has a first side connected to another side of the foot deck, and a second side connected to the wheel casing, and pushes the foot deck upward or pulls the foot deck as the volume in the second air spring varies.

\* \* \* \* \*